May 12, 1964
E. CENTRONE
3,132,606
APPARATUS FOR MANUFACTURING AND PACKING
FROZEN CONFECTIONS
Filed June 18, 1962
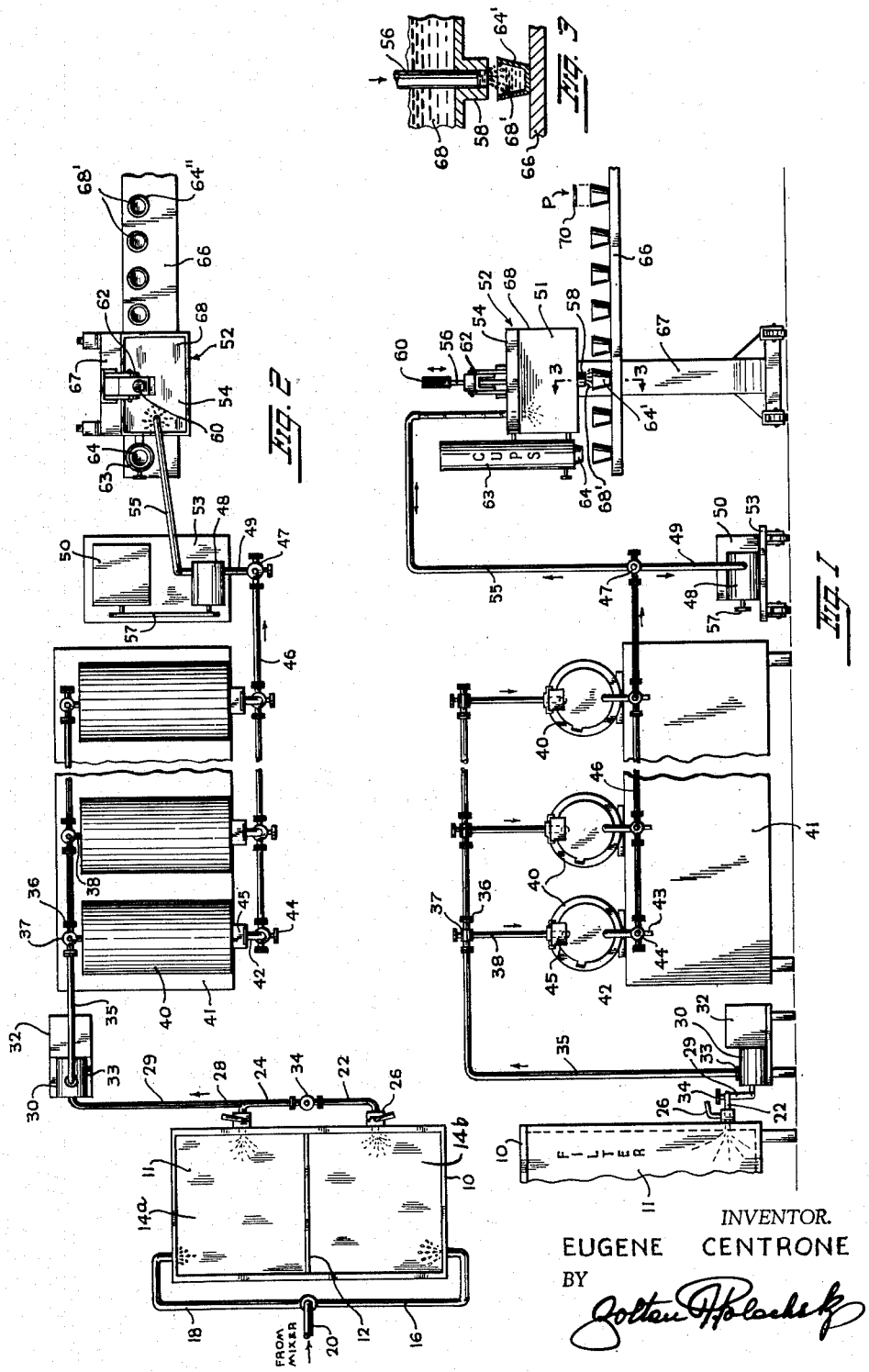
INVENTOR.
EUGENE CENTRONE
BY

United States Patent Office 3,132,606
Patented May 12, 1964

3,132,606
APPARATUS FOR MANUFACTURING AND PACKING FROZEN CONFECTIONS
Eugene Centrone, 108—22 42nd Ave., Corona, N.Y.
Filed June 18, 1962, Ser. No. 203,099
3 Claims. (Cl. 107—1)

This invention relates to apparatus for manufacturing and packing frozen confections such as ice cream, ices, ice milk, sherbet and the like.

Heretofore, it has been conventional to freeze limited quantities of different mixtures of frozen confections in batch freezing machines. The frozen or semi-frozen mixtures were then drawn off from the individual freezers into buckets. The buckets were then manually carried to a cup or carton filling machine for filling individual containers with the frozen product. The prior systems involving manual conveyance of the frozen products from the batch freezers to the container packing machines were objectionable for various reasons. The collection of frozen mixtures in open buckets was unsanitary. Lifting and handling of filled buckets was slow and required considerable laborious effort. Spillage of the mixtures from filled buckets often occurred. Much time and labor was used in cleaning the buckets, etc.

The present invention is directed at overcoming the difficulties and disadvantages of the prior systems for manufacturing and packaging frozen confections in individual containers.

A further object is to provide a system for continuously filling individual containers with frozen confections continuously fed from a plurality of batch freezers.

Another object is to provide automatic manufacturing apparatus for frozen confections.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of apparatus embodying the invention, parts being broken away.

FIG. 2 is a top plan view of the apparatus, parts being broken away.

FIG. 3 is a fragmentary sectional view taken on line 3—3 of FIG. 1.

Referring to the drawings, there is shown a tank 10 provided with transparent covers 11. The tank is divided by a vertical partition 12 into two compartments 14ª, 14ᵇ. Two pipes 16, 18 are connected to a common inlet pipe 20. The pipe 20 is connected to a mixing machine (not shown) in which the several fluid ingredients of a frozen confection are initially mixed. Such ingredients might be sugar syrup, flavorings, coloring matter, milk, cream, gelatin, etc., depending on the desired formulation of the confection. The fluid mixture is conveyed from the mixing machine to the tank 10 and is deposited in compartments 14ª, 14ᵇ. Tank 10 is provided with suitable filters and strainers through which the fluid mixture passes to outlet pipes 22, 24 via manually controllable valves 26, 28. The pipes 22, 24 are joined to a common outlet pipe 29 connected to the inlet of a pump 30 driven by motor 32. A valve is provided to control flow of the filtered mixture through pipe 29.

The pump 30 has an outlet 33 to which is connected outlet pipe 35. Pipe 35 is connected by a plurality of flanged fittings 36 and valves 37 to inlet pipes 38 of a plurality of cylindrical batch freezers 40 mounted on a support 41. The freezers are mechanical freezing machines in which the liquid mixture is frozen to a semi-fluid state. Valves 37 control the input to the individual freezers 40. Each of the freezers has an outlet pipe 42 connected by an individual control valve 44 to a common outlet pipe 46. Pipe 46 is connected via valve 47 and inlet pipe 49 to the inlet side of a pump 48 driven by belt 57 from a motor 50 mounted on a stand 53. Exhaust nozzles 43 are connected to valves 44 for draining the individual freezers instead of discharging their contents into pipe 46. The valves 44 are set to drain the freezers periodically during cleaning. Doors 45 are provided at the tops of the front ends of the freezers and opening into the freezers for filling the same with hot water, detergents and the like for cleaning the freezers. These doors remain closed during normal operations of the apparatus.

The pump 48 has an outlet pipe 55 which delivers the frozen mixture directly and continuously to a hopper 51 of packing machine 52. Hopper 51 is a cabinet preferably made of transparent plastic material so that the contents of the hopper are visible to an operator of the machine. The hopper has a removable top cover 54 on which is mounted a vertically movable plunger 56. The plunger is axially aligned with a nozzle 58 depending from the bottom of the hopper. The plunger closes the nozzle and can be lifted to clear the nozzle by a manually operable handle 60.

Handle 60 is axially and vertically movable on a support bracket 62 mounted on the top of the hopper cover. Adjacent to the hopper is mounted a cylindrical dispenser 63 of cups 64. Cups 64 are discharged from the dispenser on to a table 66 and are placed one at a time under the nozzle 58. Hopper 51 and table 66 are supported on stand 67. Frozen confection 68 in the hopper is discharged into the one cup 64' under nozzle 58 upon actuation of plunger 56; see FIG. 3. The filled cups 64'' containing confection 68' are then moved laterally along the table to a capping position P where a cap 70 is applied manually or by a capping machine. The capped cups can then be packed in cartons or other containers, stored in freezers, etc.

By opening of the valves 26, 28 one or both compartments of tank 10 discharges filtered, homogeneous mixed fluid into pipe 29. Pump 30 drives the fluid into the batch freezers which are selectively filled via valves 37. Selected ones of the freezers discharge the frozen semi-fluid confection via valves 44 to the pump 48 which drives the frozen mixture to the hopper 51. The feeding of the fluid mixture to the freezers 40 and the feeding of the filling machine 52 from the freezers can be so synchronized that the hopper 51 is continuously being supplied with fresh frozen confection as the cups 64 are being filled and capped. Thus, manufacture of the confection from the mixing of ingredients to the packing of the containers can proceed continuously and automatically. At no time is frozen confection exposed to the open air which insures its sanitary condition when packed. The mixture of ingredients through the filtering tank to the freezers 40 proceeds automatically and continuously.

The apparatus described effects an economy in labor since one operator can control the several valves while the fluid mixture in both unfrozen and frozen form is driven by the pumps through the piping to the freezers 40 and packing machine 52. The packed frozen confection is clean and sanitary at all stages of its manufacture and packaging.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An apparatus for manufacturing and packing frozen confections, comprising a tank for containing a homogenized mixture of ingredients of said confection in fluid form, a plurality of batch freezers, having inlets and outlets, a motor driven pump having an inlet and outlet, first piping connecting said tank to an inlet of the pump, second piping connecting the outlet of the pump to inlets of the respective freezers for delivering said mixture to the freezers, another motor driven pump having an inlet and outlet, third piping connecting outlets of the freezers to the inlet of the other pump, a machine having a hopper for dispensing frozen confection, and fourth piping connecting the outlet of the other pump to said hopper for delivering frozen confection in semifluid form from the freezers to the hopper, said hopper having a dispensing nozzle, and a plunger carried by the hopper and movable into said nozzle for driving the frozen confection out of the hopper into a container for said confection.

2. An apparatus for manufacturing and packing frozen confections, comprising a tank for containing a homogenized mixture of ingredients of said confection in fluid form, a plurality of batch freezers, having inlets and outlets, a motor driven pump having an inlet and outlet, first piping connecting said tank to an inlet of the pump, second piping connecting the outlet of the pump to inlets of the respective freezers for delivering said mixture to the freezers, another motor driven pump having an inlet and outlet, third piping connecting outlets of the freezers to the inlet of the other pump, a machine having a hopper for dispensing frozen confection, and fourth piping connecting the outlet of the other pump to said hopper for delivering frozen confection in semifluid form from the freezers to the hopper, the first, second, third and fourth piping having individual valves for feeding fluid confection to selected ones of the freezers and drawing semifluid confection from other selected ones of the freezers, each of the freezers having an outlet nozzle controlled by a different one of the valves for selectively draining the individual freezers while cutting off the outlets of the draining freezers from the third piping, said hopper having a dispensing nozzle, and a plunger carried by the hopper and movable into said nozzle for driving the frozen confection out of the hopper into a container for said confection.

3. An apparatus for manufacturing and packing frozen confections, comprising a tank for containing a homogenized mixture of ingredients of said confection in fluid form, a plurality of batch freezers, having inlets and outlets, a motor driven pump having an inlet and outlet, first piping connecting said tank to an inlet of the pump, second piping connecting the outlet of the pump to inlets of the respective freezers for delivering said mixture to the freezers, another motor driven pump having an inlet and outlet, third piping connecting outlets of the freezers to the inlet of the other pump, a machine having a hopper for dispensing frozen confection, and fourth piping connecting the outlet of the other pump to said hopper for delivering frozen confection in semifluid form from the freezers to the hopper, the first, second, third and fourth piping having individual valves for feeding fluid confection to selected ones of the freezers and drawing semifluid confection from other selected ones of the freezers, said hopper having a dispensing nozzle, and a plunger carried by the hopper and movable into said nozzle for driving the frozen confection out of the hopper into a container for said confection.

References Cited in the file of this patent
UNITED STATES PATENTS

| | | |
|---|---|---|
| 683,327 | Prinz | Sept. 24, 1901 |
| 2,130,113 | Adams | Sept. 13, 1938 |
| 2,313,060 | Friedman | Mar. 9, 1943 |
| 2,344,901 | Routh | Mar. 21, 1944 |
| 2,641,546 | Decker | June 9, 1953 |
| 2,843,493 | Sharples | July 15, 1958 |
| 3,014,437 | Dutchess | Dec. 26, 1961 |